(12) United States Patent
Nam

(10) Patent No.: US 12,003,726 B2
(45) Date of Patent: *Jun. 4, 2024

(54) METHOD AND APPARATUS FOR CABAC-BASED ENTROPY CODING

(71) Applicant: LG ELECTRONICS INC., Seoul (KR)

(72) Inventor: Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,515

(22) Filed: Apr. 17, 2023

(65) Prior Publication Data

US 2023/0254490 A1 Aug. 10, 2023

Related U.S. Application Data

(63) Continuation of application No. 18/125,358, filed on Mar. 23, 2023, which is a continuation of application No. 17/568,141, filed on Jan. 4, 2022, now Pat. No. 11,665,349, which is a continuation of application No. 17/120,716, filed on Dec. 14, 2020, now Pat. No. 11,330,267, which is a continuation of application No. PCT/KR2019/007213, filed on Jun. 14, 2019.

(60) Provisional application No. 62/692,887, filed on Jul. 2, 2018.

(30) Foreign Application Priority Data

Jun. 15, 2018 (KR) .......................... 10-2018-0069073

(51) Int. Cl.
H04N 19/13 (2014.01)
H04N 19/176 (2014.01)
H04N 19/46 (2014.01)
H04N 19/70 (2014.01)

(52) U.S. Cl.
CPC ............ *H04N 19/13* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

2020/0344475 A1* 10/2020 Zhu ...................... H04N 19/119

* cited by examiner

*Primary Examiner* — Christopher Braniff
(74) *Attorney, Agent, or Firm* — Bryan Cave Leighton Paisner LLP

(57) ABSTRACT

A picture decoding method performed by a decoding device according to an embodiment of the present disclosure comprises the steps of: deriving a context index for a split flag syntax element on the basis of split availability information of a current block; determining a context model on the basis of the derived context index; decoding a value of the split flag syntax element on the basis of a CABAC, using the determined context model; deriving a current coding unit from the current block on the basis of the value of the split flag syntax element; deriving a predicted block on the basis of inter prediction or intra prediction for the current coding unit; and generating a reconstructed block on the basis of the predicted block.

3 Claims, 14 Drawing Sheets

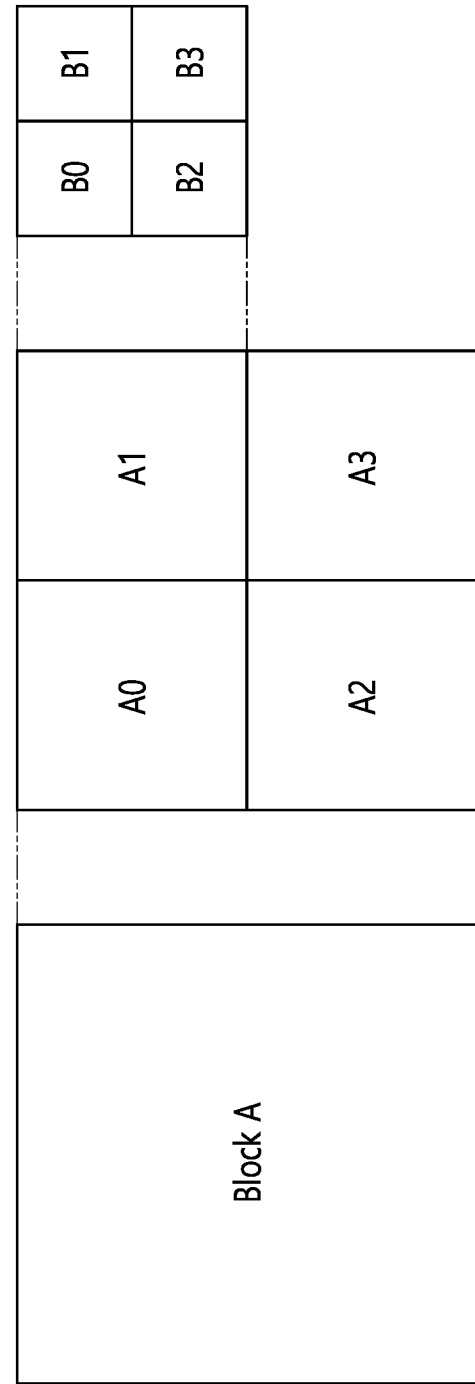

METHOD AND APPARATUS FOR CABAC-BASED ENTROPY CODING

CROSS-REFERENCE TO RELATED APPLICATIONS

This application is a Continuation of U.S. application Ser. No. 18/125,358, filed Mar. 23, 2023, which is a Continuation of U.S. application Ser. No. 17/568,141, filed on Jan. 4, 2022, which is a continuation of U.S. application Ser. No. 17/120,716, filed on Dec. 14, 2020 (now U.S. Pat. No. 11,330,267, issued on May 10, 2022), which is a continuation of International PCT/KR2019/007213, filed on Jun. 14, 2019, which claims the benefit of U.S. Provisional Application No. 62/692,887, filed on Jul. 2, 2018, and Korean Application No. 10-2018-0069073, filed on Jun. 15, 2018, the contents of which are all hereby incorporated by reference herein in their entirety.

BACKGROUND OF THE DISCLOSURE

Field of the Disclosure

The present disclosure relates to a still image or a video image encoding/decoding method, and more specifically, to a method and an apparatus for splitting a region into a quad tree (QT) structure and using a context model when performing CABAC entropy coding based on binary tree (BT) and ternary tree (TT) structures.

Related Art

Demands for high-resolution and high-quality images, such as High Definition (HD) images and Ultra High Definition (UHD) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide a method and an apparatus for enhancing efficiency of an image coding based on CABAC.

Still another object of the present disclosure is to provide a method and an apparatus for determining a block structure and a block split based on a quad tree (QT) structure, a binary tree (BT) structure, and a ternary tree (TT) structure in a process of compressing an image.

Yet another object of the present disclosure is to provide a method and an apparatus for encoding and decoding an image more efficiently using a context model, when performing an entropy encoding according to CABAC based on the QT structure, the BT structure, and the TT structure.

An exemplary embodiment of the present disclosure provides a picture decoding method performed by a decoding apparatus. The method includes: deriving a context index for a split flag syntax element based on split availability information of a current block, determining a context model based on the derived context index, decoding a value of the split flag syntax element based on context-based adaptive binary arithmetic coding (CABAC) by using the determined context model, deriving a current coding unit from the current block based on the value of the split flag syntax element, deriving a predicted block based on inter-prediction or intra-prediction for the current coding unit, and generating a reconstructed block based on the predicted block, in which the split flag syntax element includes: a directional split flag representing whether the current block is to be vertically split, the split availability information includes: an information binary tree (BT) horizontal split available flag information representing whether the current block may be horizontally split based on a BT structure, a ternary tree (TT) horizontal split available flag information representing whether the current block is horizontally split based on a TT structure, a BT vertical split available flag information representing whether the current block is vertically split based on the BT structure, and a TT vertical split available flag information representing whether the current block is vertically split based on the TT structure, and the context index for the directional split flag is derived based on the BT horizontal split available flag information, the TT horizontal split available flag information, the BT vertical split available flag information, and the TT vertical split available flag information.

Another exemplary embodiment of the present disclosure provides a decoding apparatus for performing picture decoding. The decoding apparatus includes: an entropy decoder configured to derive a context index for a split flag syntax element based on split availability information of a current block, determine a context model based on the derived context index, decode a value of the split flag syntax element based on CABAC using the determined context model, and derive a current coding unit from the current block based on the value of the split flag syntax element, a predictor configured to derive a predicted block based on inter-prediction or intra-prediction for the current coding unit, and an adder configured to generate a reconstructed block based on the predicted block, in which the split flag syntax element includes: a directional split flag representing whether the current block is vertically split, the split availability information includes: a BT horizontal split available flag information representing whether the current block may be horizontally split based on a BT structure, a TT horizontal split available flag information representing whether the current block may be horizontally split based on a TT structure, a BT vertical split available flag information representing whether the current block may be vertically split based on the BT structure, and a TT vertical split available flag information representing whether the current block may be vertically split based on the TT structure, and the context index for the directional split flag is derived based on the BT horizontal split available flag information, the TT horizontal split available flag information, the BT vertical split available flag information, and the TT vertical split available flag information.

Still another exemplary embodiment of the present disclosure provides a picture encoding method performed by an encoding apparatus. The method includes: deriving a split flag syntax element representing a split structure of a current block, deriving a context index for the split flag syntax element based on split availability information of the current block, determining a context model based on the derived context index, and encoding a value of the split flag syntax element based on CABAC using the determined context model, in which the split flag syntax element includes: a directional split flag representing whether the current block is to be vertically split, the split availability information includes: a BT horizontal split available flag information representing whether the current block may be horizontally split based on a BT structure, a TT horizontal split available flag information representing whether the current block may be horizontally split based on a TT structure, a BT vertical split available flag information representing whether the current block may be vertically split based on the BT structure, and a TT vertical split available flag information representing whether the current block may be vertically split based on the TT structure, and the context index for the directional split flag is derived based on the BT horizontal split available flag information, the TT horizontal split available flag information, the BT vertical split available flag information, and the TT vertical split available flag information.

Yet another exemplary embodiment of the present disclosure provides an encoding apparatus for performing picture encoding. The encoding apparatus includes: an entropy encoder configured to derive a split flag syntax element representing a split structure of a current block, derive a context index for the split flag syntax element based on split availability information of the current block, determine a context model based on the derived context index, and encode a value of the split flag syntax element based on CABAC using the determined context model, in which the split flag syntax element includes: a directional split flag representing whether the current block is to be vertically split, the split availability information includes: a BT horizontal split available flag information representing whether the current block may be horizontally split based on a BT structure, a TT horizontal split available flag information representing whether the current block may be horizontally split based on a TT structure, a BT vertical split available flag information representing whether the current block may be vertically split based on the BT structure, and a TT vertical split available flag information representing whether the current block may be vertically split based on the TT structure, and the context index for the directional split flag is derived based on the BT horizontal split available flag information, the TT horizontal split available flag information, the BT vertical split available flag information, and the TT vertical split available flag information.

The present disclosure may enhance the overall image/video compression efficiency.

The present disclosure may enhance the efficiency of the image coding based on the intra-prediction.

The present disclosure may enhance the efficiency of the image coding based on the CABAC.

The present disclosure may improve the pipeline delay, when implementing the intra-prediction based on the CCLM in hardware.

The present disclosure may determine the block structure and the block split based on the quad tree (QT) structure, the binary tree (BT) structure, and the ternary tree (TT) structure in the process of compressing the image.

The present disclosure may encode and decode the image more efficiently using the context model, when performing the entropy encoding according to the CABAC based on the QT structure, the BT structure, and the TT structure.

BRIEF DESCRIPTION OF THE DRAWINGS

FIGS. 3A to 3C are diagrams illustrating examples of a QT split, a BT split, and a TT split.

DESCRIPTION OF EXEMPLARY EMBODIMENTS

Figure 1:
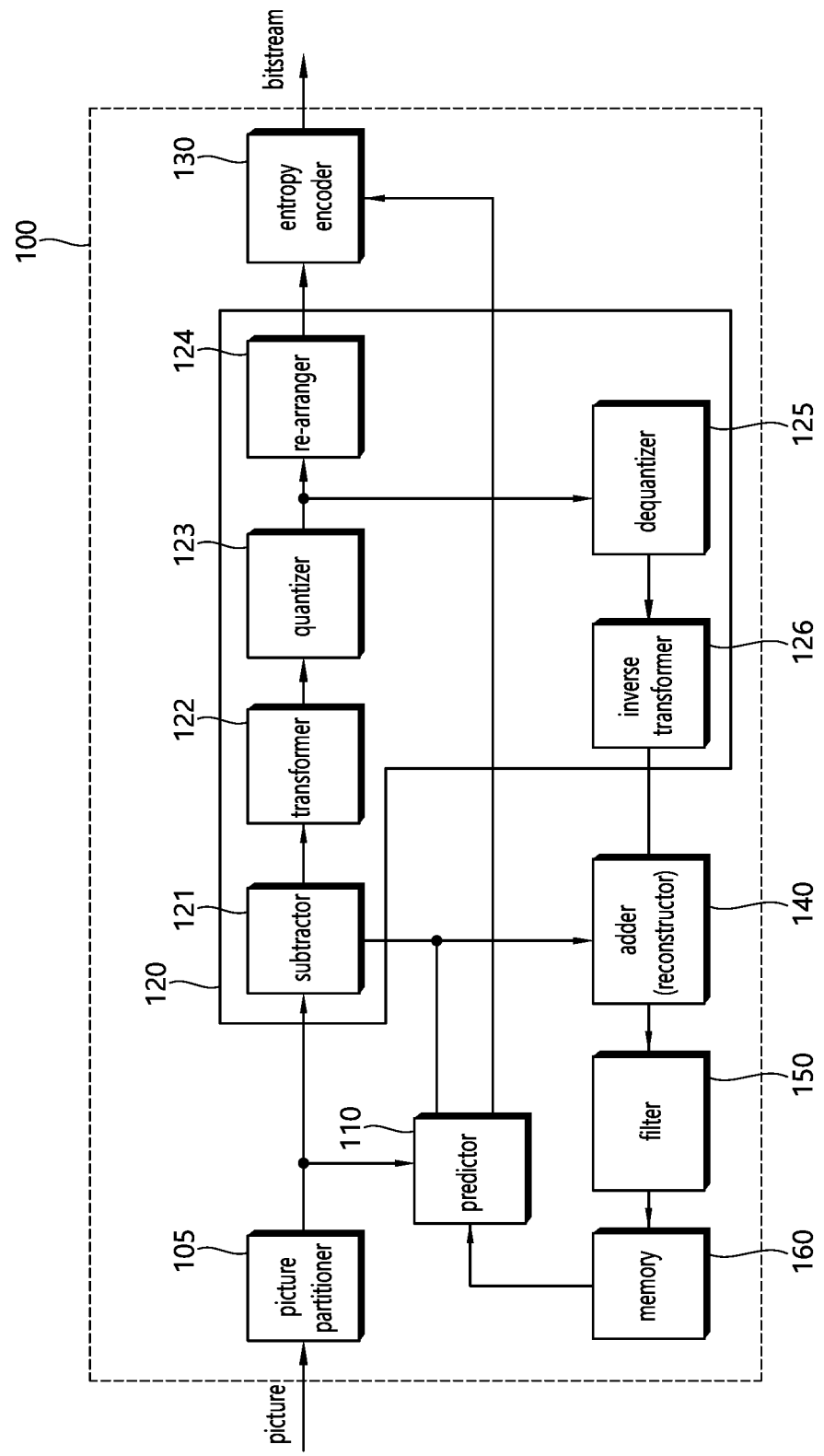
FIG. 1 is a diagram for schematically explaining a configuration of an encoding apparatus according to an exemplary embodiment.

An exemplary embodiment of the present disclosure provides a picture decoding method performed by a decoding apparatus. The method includes: deriving a context index for a split flag syntax element based on spit availability information of a current block, determining a context model based on the derived context index, decoding a value of the split flag syntax element based on context-based adaptive binary arithmetic coding (CABAC) using the determined context model, deriving a current coding unit from the current block based on the value of the split flag syntax element, deriving a predicted block based on inter-prediction or intra-prediction for the current coding unit, and generating a reconstructed block based on the predicted block, in which the split flag syntax element includes a directional split flag representing whether the current block is vertically split; the split availability information includes BT horizontal split available flag information representing whether the current block may be horizontally split based on a binary tree (BT) structure, TT horizontal split available flag information representing whether the current block may be horizontally split based on the ternary tree (TT) structure, BT vertical split available flag information representing whether the current block may be vertically split based on the BT structure, and TT vertical split available flag information representing whether the current block may be vertically split based on the TT structure; and the context index for the directional split flag is derived based on the BT horizontal split available flag information, the TT horizontal split available flag information, the BT vertical split available flag information, and the TT vertical split available flag information.

Since the present disclosure may be variously modified and may have various exemplary embodiments, specific exemplary embodiments will be illustrated in the drawings and described in detail. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description relates to a video/image coding. For example, the method/exemplary embodiments disclosed in this document may be applied to a method disclosed in a versatile video coding (VVC) standard, an essential video coding (EVC) standard, an AOMedia Video 1 (AV1) standard, a 2nd generation of audio video coding (AVS2) standard, or a next-generation video/image coding standard (e.g., H.267, H.268, or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally, a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 is a diagram briefly illustrating a structure of an encoding apparatus to which the present disclosure is applicable. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block.

For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (I)), or may derive the prediction sample based on a reference sample existing in a specific (prediction) direction as to a prediction sample among the neighboring reference samples of the current block (case (ii)). The case (a) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, the highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pre-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
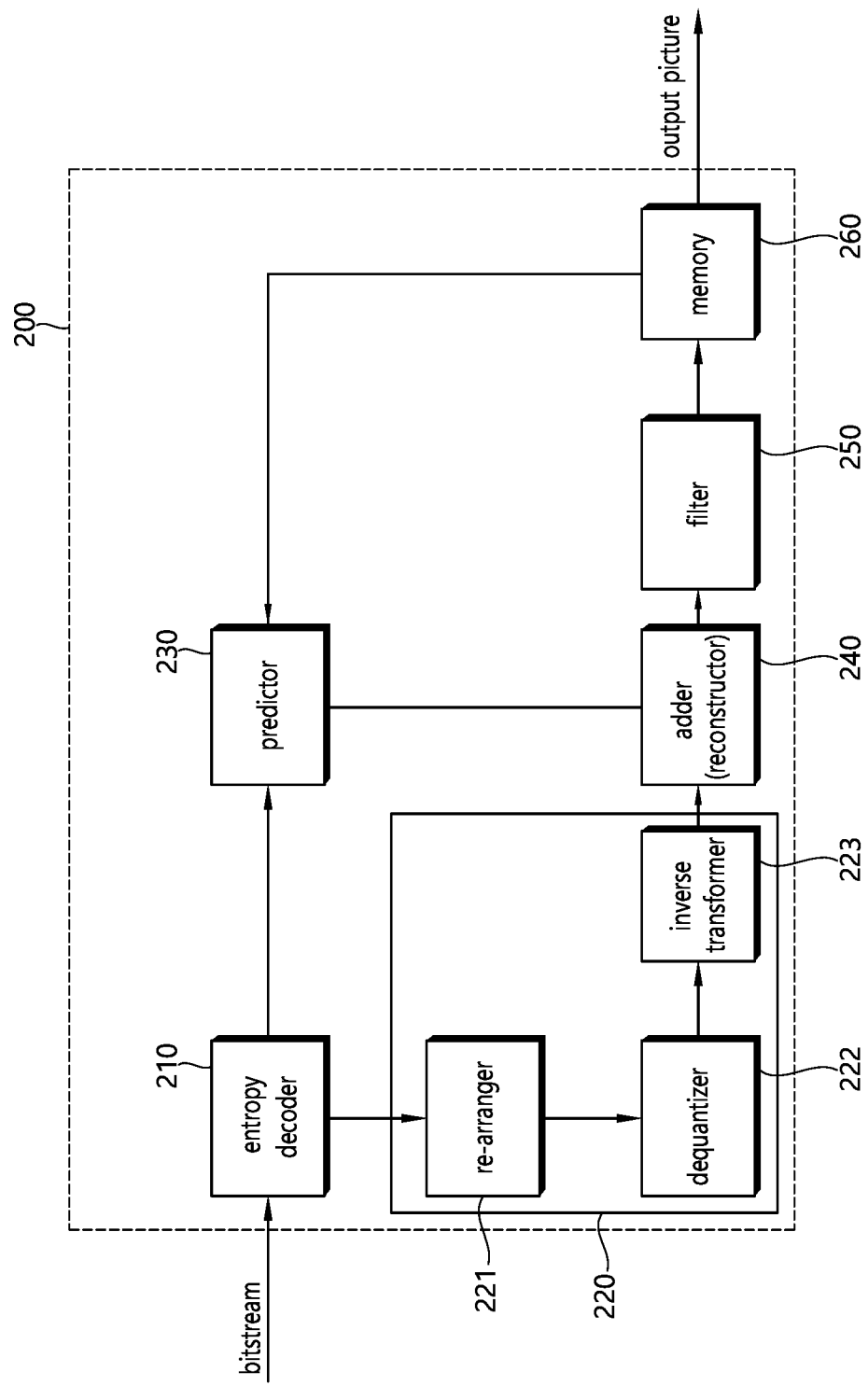
FIG. 2 is a diagram for schematically explaining a configuration of a decoding apparatus according to the exemplary embodiment.

FIG. 2 is a diagram briefly illustrating a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223. Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternary tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode, and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, position information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3B:
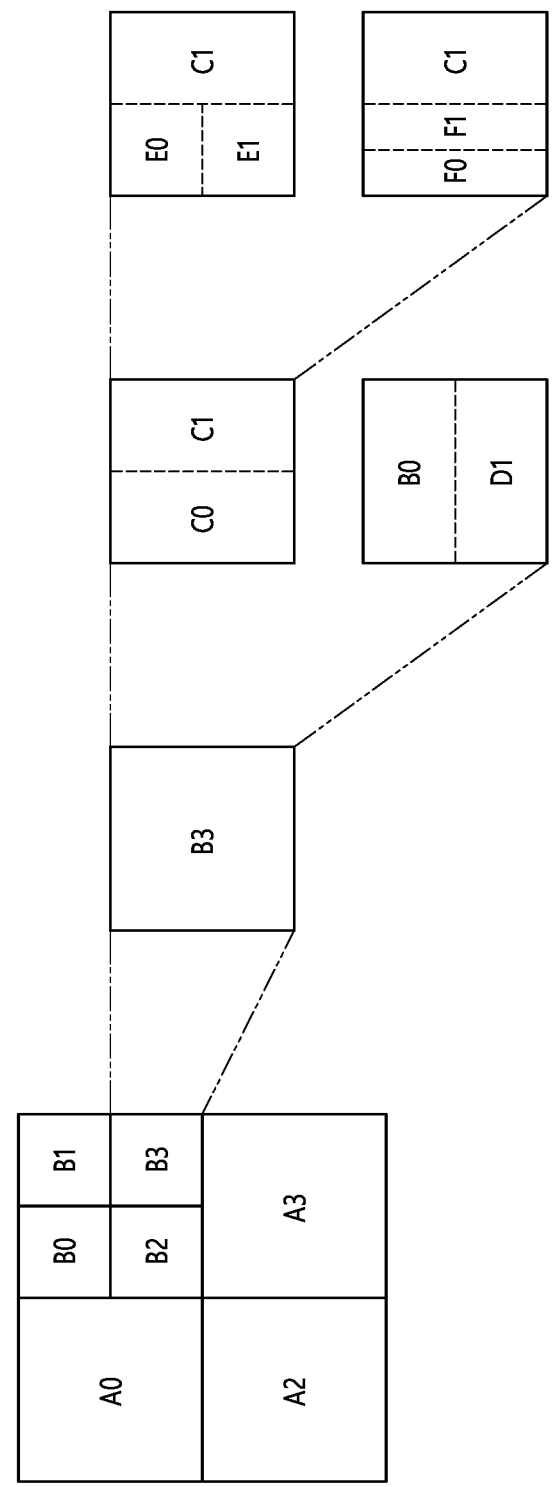
Figure 3C:
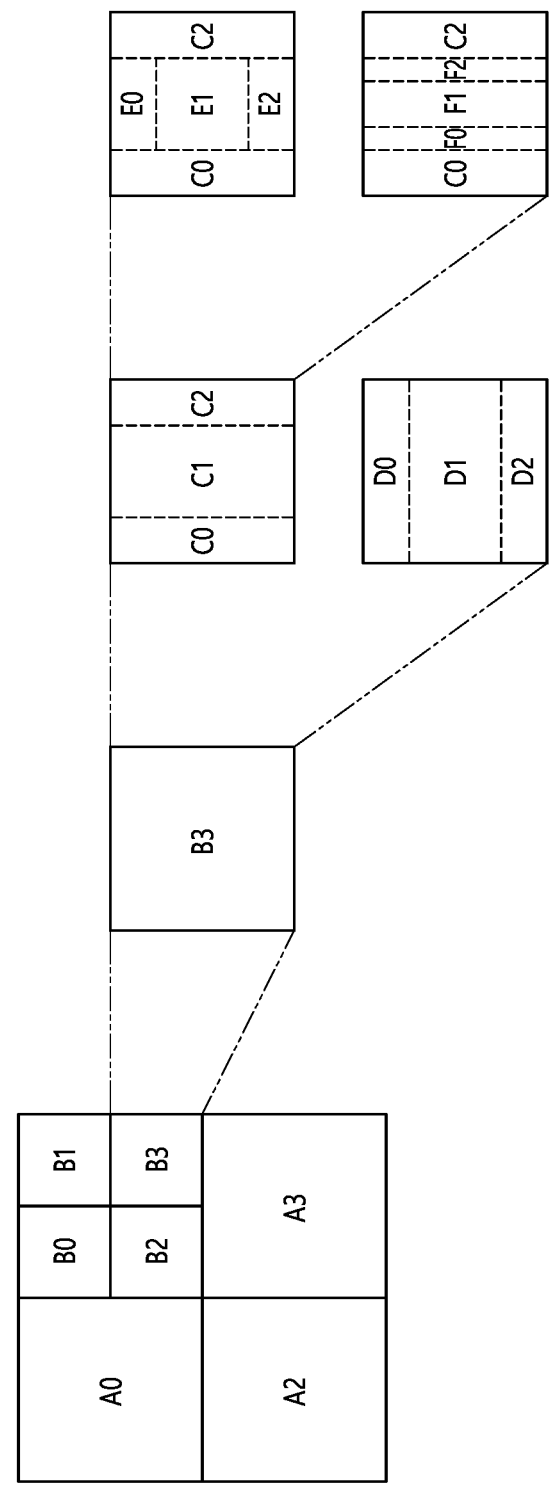

FIGS. 3A to 3C are diagrams illustrating examples of a QT split, a BT split, and a TT split.

In a video coding, one block may be split based on a quad tree (QT). Further, one sub block split by the QT may be further split recursively using the QT. A leaf block not split by the QT any more may be split by a binary tree (BT), a ternary tree (TT), a stripe tree (ST), or the like. The BT may have two forms of splits such as a horizontal BT (2N×N, 2N×N) and a vertical BT (N×2N, N×2N). The TT may have two forms of splits such as a horizontal TT (2N×1/2N, 2N×N, 2N×1/2N) and a vertical TT (1/2N×2N, N×2N, 1/2N×2N). The ST may have two forms of splits such as a horizontal ST (2N×1/2N, 2N×1/2N, 2N×1/2N, 2N×1/2N) and a vertical ST (1/2N×2N, 1/2N×2N, 1/2N×2N, 1/2N×2N). Each of the BT, the TT, and the ST may be further split recursively using the BT, the TT, and the ST.

FIG. 3A illustrates an example of the QT split. A block A may be split into four sub blocks (A0, A1, A2, A3) by the QT. The sub block A1 may be split into four sub blocks (B0, B1, B2, B3) by the QT again.

FIG. 3B illustrates an example of the BT split. The block B3 not split by the QT any more may be split into a vertical BT (C0, C1) or a horizontal BT (D0, D1). Like the block C0, each sub block may be further split recursively like the form of a horizontal BT (E0, E1) or a vertical BT (F0, F1).

FIG. 3C illustrates an example of the TT split. The block B3 not split by the QT any more may be split into a vertical TT (C0, C1, C2) or a horizontal TT (D0, D1, D2). Like the block C1, each sub block may be further split recursively like the form of a horizontal TT (E0, E1, E2) or a vertical TT (F0, F1, F2).

Table 1 below expresses an example of coding quadtree syntaxes, in the case of using the BT and the TT.

TABLE 1

| | Descriptor |
|---|---|
| coding_quadtree( x0, y0, log2CbSize, cqtDepth ) { <br>    if( x0 + ( 1 << log2CbSize ) <= pic_width_in_luma_samples && <br>        y0 + ( 1 << log2CbSize ) <= pic_height_in_luma_samples && <br>        log2CbSize > MinCbLog2SizeY ) <br>       split_qt_flag[ x0 ][ y0 ] <br>    if ( split_cu_flag[ x0 ][ y0 ] ) { <br>       x1 = x0 + ( 1 << ( log2CbSize − 1 ) ) <br>       y1 = y0 + ( 1 << ( log2CbSize − 1 ) ) <br>       coding_quadtree( x0, y0, log2CbSize −1, cqtDepth+1 ) <br>       coding_quadtree( x1, y0, log2CbSize − 1, cqtDepth + 1 ) <br>       coding_quadtree( x1, y0, log2CbSize − 1, cqtDepth + 1 ) <br>       coding_quadtree( x1, y0, log2CbSize − 1, cqtDepth + 1 ) <br>    } else { <br>       coding_tree( x0, y0, log2CbSize, log2CbSize) <br>    } <br>} | ae(v) |

A syntax element split_qt_flag represents whether a current (encoding) block is split into four by the QT. When a value of the split_qt_flag is 0, it means that the current block is not split by the QT, and when the value of the split_qt_flag is 1, it means that the current block is split by the QT. The x0 and the y0 represent a top-left location of a luma image.

The present specification uses specific terms or sentences for defining specific information or concept. For example, split_flag, such that the specific terms or sentences used for defining the specific information or concept in the present specification should not be interpreted as being limited to those names throughout the specification, and need to be interpreted by focusing on various operations, functions, and effects according to the contents represented by the terms.

Table 2 below expresses an example of the syntaxes for the coding tree.

TABLE 2

| | Descriptor |
|---|---|
| coding_tree( x0, y0, log2CbSizeW, log2CbSizeH) { <br>    if( x0 + ( 1 < log2CbSize ) <= pic_width_in_luma_samples && <br>        y0 + ( 1 << log )CbSize ) <= pic_height_in_luma_samples && <br>        log2CbSize > MinBTTCbLog2SizeY ) <br>      split_fur_flag[ x0 ][ y0 ] <br>    if ( split_fur_flag[ x0 ][ y0 ) { <br>      split_bt_flag[ x0 ][ y0 ] <br>      split_dir[ x0 ][ y0 ] <br>    } <br>    if( SplitMode == PART_BT_HOR) { <br>     coding_tree ( x0, y0, log2CbSizeW, log2CbSizeH − 1 ) <br>     coding_ tree ( x0, y0 + (1 << ( log2CbSizeH − 1 )), log2CbSizeW, log2CbSizeH − 1) <br>    } else if ( SplitMode == PART_DT_VER) { <br>     coding_tree ( x0, y0, log2CbSizeW − 1, log2CbSizeH) <br>     coding_tree ( x0 + (1 << ( log2CbSizeW − 1 )), y0, log2CbSizeW − 1, log2CbSizeH) <br>    } else if ( SplitMode == PART_TT_HOR) { <br>     coding_tree ( x0, y0, log2CbSizeW, log2CbSizeH − 2 ) <br>     coding_tree ( x0, y0 + (1 << ( log2CbSizeH − 2 )), log2CbSizeW, log2CbSizeH − 1) <br>     coding_tree ( x0, y0 + (1 << ( log2CbSizeH − 2 ) + (1 << ( log2CbSizeH − 1 )), <br>log2CbSizeW, log2CbSizeH − 2) <br>    } else if ( SplitMode == PART_TT_VER) { <br>     coding_tree ( x0, y0, log2CbSizeW − 2, log2CbSizeH) <br>     coding_tree ( x0 + (1 << ( log2CbSizeW − 2 )), y0, log2CbSizeW − 1, log2CbSizeH) <br>     coding_tree ( x0 + (1 << ( log2CbSizeW − 2 ) + (1 < ( log2CbSizeW − 1 )), y0, <br>log2CbSizeW − 2, log2CbSizeH) <br>    } <br>  } else { <br>    coding_unit(x0, y0, log2CbSizeW, log2CbSizeH) <br>  } <br>} | ae(v)<br><br>ae(v)<br>ae(v) | the present specification uses specific terms or sentences for defining a specific syntax element. As an example, the present specification defines the syntax element representing whether the current (encoding) block is split into 4 by the QT as the "split_qt_flag", and defines a syntax element representing whether the current (encoding) block is further split as a "split_fur_flag". However, the "split_qt_flag" may be replaced with various terms such as a qt_split_flag and a QT split flag, and the "split_fur_flag" may be replaced with various terms such as a further_split_flag and a fur_

The syntax element split_fur_flag represents whether the current (encoding) block is further split. When a value of the split_fur_flag is 0, it means that the current block is not split any more, and when the value of the split_fur_flag is 1, it means that the current block is split. The syntax element split_bt_flag represents whether the current block is split based on the BT or the TT. When a value of the split_bt_flag is 1, it means that the current block is split based on the BT, and when the value of the split_bt_flag is 0, it means that the current block is split based on the TT.

A split type (SplitType) of the current block may be determined as expressed in Table 3 below based on the syntax element split_fur_flag and the syntax element split_bt_flag.

TABLE 3

| split_fur_flag | split_bt_flag | SplitType |
|---|---|---|
| 0 | | NO_SPLIT |
| 1 | 1 | BT |
| 1 | 0 | TT |

Referring to Table 3, when the value of the split_fur_flag is 0 and the current block is not split any more, it may be confirmed that the SplitType is determined as NO_SPLIT. Further, when the value of the split_fur_flag is 1 and the current block is split, it may be confirmed that the SplitType is determined as the BT when the value of the split_bt_flag is 1, and the SplitType is determined as the TT when the value of the split_bt_flag is 0.

The syntax element split_dir represents a direction in which the current block is split. When a value of the split_dir is 0, it means that the current block is horizontally split, and when the value of the split_dir is 1, it means that the current block is vertically split. A split mode (SplitMode) of the block may be induced as expressed in Table 4 below, based on the SplitType and the split_dir.

TABLE 4

| SplitType | split_dir | SplitMode |
|---|---|---|
| BT | 0 | PART_BT_HOR |
| | 1 | PART_BT_VER |
| TT | 0 | PART_TT_HOR |
| | 1 | PART_TT_VER |

Referring to the Table 4, when the SplitType is the BT, it may be confirmed that the SplitMode is determined as the PART_BT_HOR, that is, the BT horizontal split mode when the value of the split_dir is 0, and the SplitMode is determined as the PART_BT_VER, that is, the BT vertical split mode when the value of the split_dir is 1. Further, when the SplitType is the TT, it may be confirmed that the SplitMode is determined as the PART_TT_HOR, that is, the TT horizontal split mode when the value of the split_dir is 0, and the SplitMode is determined as the PART_TT_VER, that is, the TT vertical split mode when the value of the split_dir is 1.

When the region of each image is split into the QT structure, the encoder and the decoder may transmit the syntax element adjusting the split degree of the QT in consideration of the relationship between performance and complexity. For example, the syntax elements such as the maximum QT block size (MaxQTSize), the minimum QT block size (MinQTSize), and the maximum QT block split depth (MaxQTDepth) may be transmitted. Here, the maximum QT block size may mean the size of the maximum block first split by the QT, and be expressed in the form of the log 2 scale. The minimum QT block size may mean the size of the smallest block by the QT split, and be expressed in the form of the log 2 scale. Further, the maximum QT split depth may mean how many times QT splits are allowed from the maximum QT block size.

When the region of each image is split into the QT structure and the block is split into the BT structure, the encoder and the decoder may transmit the syntax element adjusting the split degree of the BT in consideration of the relationship between the performance and complexity. For example, the syntax elements such as the maximum BT block size (MaxBTSize), the minimum BT block size (MinBTSize), and the maximum BT block split depth (MaxBTDepth) may be transmitted. More specifically, the maximum BT block size may mean the size of the maximum block in which the BT split is first allowed, and be expressed in the form of the log 2 scale. The minimum BT block size may mean the size of the smallest block by the BT split, and be expressed in the form of the log 2 scale. Further, the maximum BT split depth may mean how many times BT splits are allowed from the maximum BT block size.

When the region of each image is split into the QT structure and then the block is split into the TT structure, the encoder and the decoder may transmit the syntax element adjusting the split degree of the TT in consideration of the relationship between performance and complexity. For example, the syntax elements such as the maximum TT block size (MaxTTSize), the minimum TT block size (MinTTSize), and the maximum TT block split depth (MaxTTDepth) may be transmitted. More specifically, the maximum TT block size may mean the size of the maximum block in which the TT split is first allowed, and be expressed in the form of the log 2 scale. The minimum TT block size may mean the size of the smallest block by the TT split, and be expressed in the form of the log 2 scale. Further, the maximum TT split depth may mean how many times TT splits are allowed from the maximum TT block size.

Figure 4:
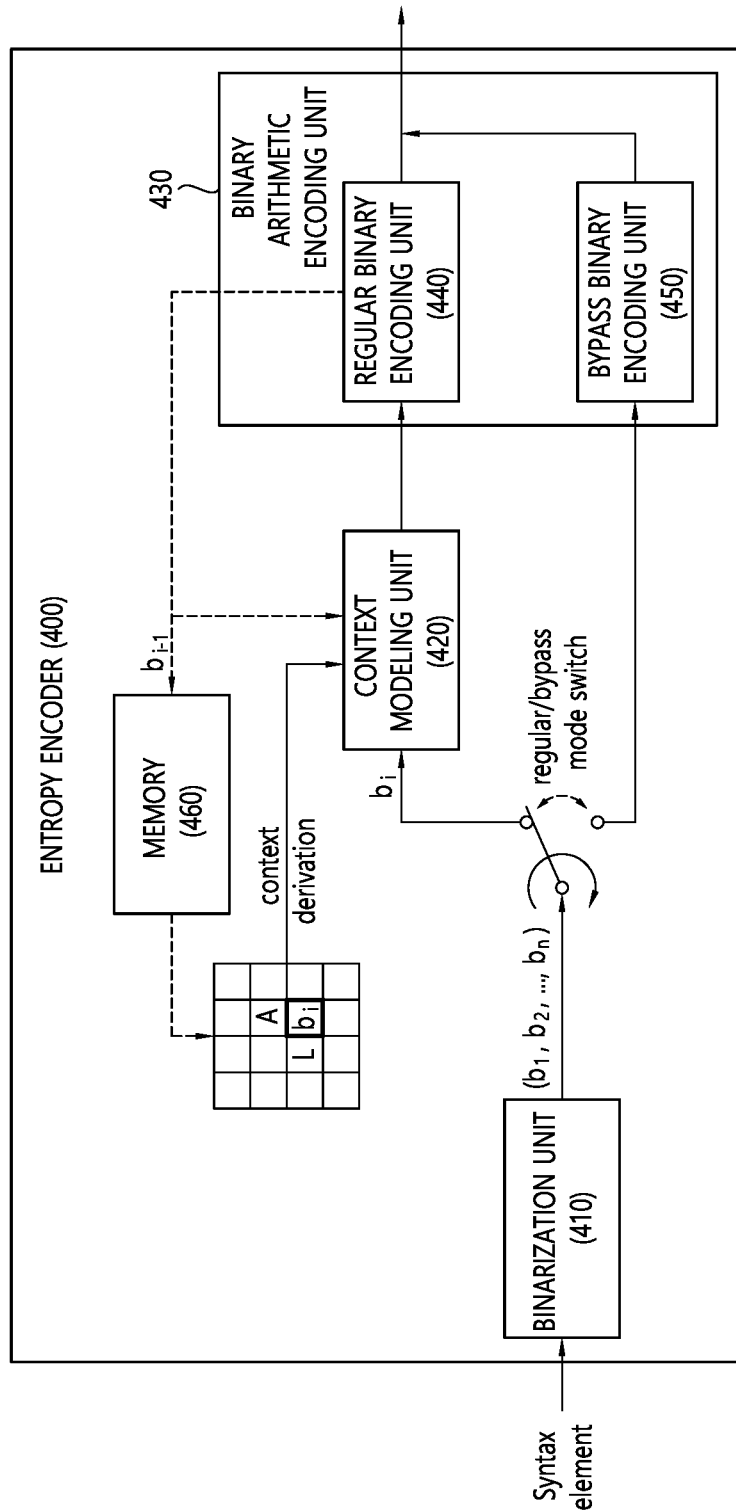
FIG. 4 is a block diagram illustrating a configuration of an entropy encoder according to the exemplary embodiment.

FIG. 4 is a block diagram illustrating a configuration of an entropy encoder according to the exemplary embodiment.

FIG. 4 illustrates a schematic block diagram of the entropy encoder to which the context-based adaptive binary arithmetic coding (CABAC) is applied, as an exemplary embodiment to which the present disclosure is applied.

An entropy encoder 400 to which the present disclosure is applied includes a binarization unit 410, a context modeling unit 420, a binary arithmetic encoding unit 430, and a memory 460, in which the binary arithmetic encoding unit 430 may include a regular binary encoding unit 440 and a bypass binary encoding unit 450. Here, the regular binary encoding unit 440 and the bypass binary encoding unit 450 may also be called a regular coding engine and a bypass coding engine, respectively.

The binarization unit 410 may receive the sequence of data symbols and perform binarization, thereby outputting a binary symbol (bin) string composed of a binarized value of 0 or 1. The binarization unit 410 may map the syntax elements with the binary symbols. Various different binarization processes, for example, unary (U), truncated unary (TU), kth Exp-Golomb (EGk), fixed length processes, and the like may be used for binarization. The binarization process may be selected based on the form of the syntax element.

The outputted bin string may be transmitted to the context modeling unit 420.

The context modeling unit 420 may select probability information necessary for coding the current block from the memory to transmit the probability information to the binary arithmetic encoding unit 430. For example, the context modeling unit 420 may select a context memory based on a syntax element to be coded and select the probability information necessary for coding the current syntax element through a bin index (binIdx). Here, the context means information about the occurrence probability of the symbol, and the context modeling may mean a process of estimating the probability of the bin necessary for the binary arithmetic coding by receiving the bin, which is the binarization result.

The context modeling unit 420 may provide (accurate) probability estimation necessary for achieving enhanced coding efficiency. Therefore, different context models may be used for different binary symbols and the probability of the context model may be updated based on the values of the previously coded binary symbol. At this time, the values of the previously coded binary symbol are stored in the memory 460, and the context modeling unit 420 may use the values of the previously coded binary symbol from the memory 460.

The binary symbols having a similar distribution may share the same context model. The context model for each binary symbol may use at least one of the syntax information of the bin, the bin index (binIdx) representing the location of the bin in the bin string, and the probability of the bin included in the neighbor block of the block in which the bin is included, for estimating the probability.

The binary arithmetic encoding unit 430 includes the regular binary encoding unit 440 and the bypass binary encoding unit 450, and may perform the entropy encoding for the outputted string and output the compressed data bits.

The regular binary encoding unit 440 may perform the arithmetic coding based on a recursive interval division.

First, a section (or range) having an initial value of 0 or 1 may be split into two lower sections based on the probability of the binary symbol. The encoded bits may provide an offset selecting one of two lower sections representing a value of the decoded binary symbol when being transformed into the binary fraction.

After the binary symbol of the decoded mode, the section may be updated to make the selected lower section the same, and the section split process itself may be repeated. The section and the offset have limited bit precision, and therefore, renormalization may be required to prevent overflow every time the section reduces to a specific value or less. The renormalization may occur after each binary symbol is decoded.

The bypass binary encoding unit 450 performs the encoding without the context model, and may perform the coding by fixing the probability of the currently coded bin as 0.5. This may be used when it is difficult to determine the probability of the syntax or the high-speed coding is required.

Figure 5:
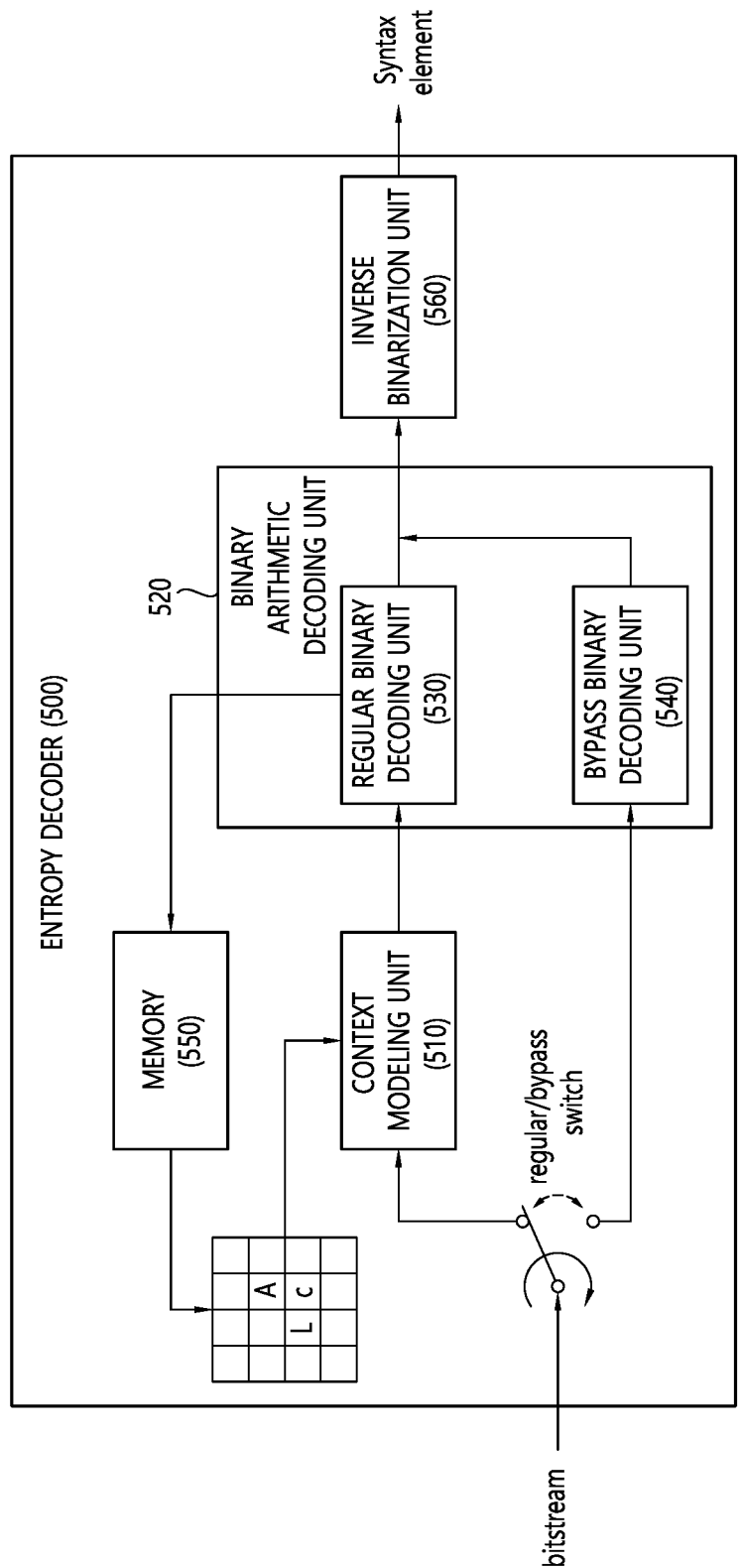
FIG. 5 is a block diagram illustrating a configuration of an entropy decoder according to the exemplary embodiment.

FIG. 5 is a block diagram illustrating a configuration of an entropy decoder according to the exemplary embodiment.

FIG. 5 illustrates a schematic block diagram of the entropy decoder to which the context-based adaptive binary arithmetic coding (CABAC) is applied, as the exemplary embodiment to which the present disclosure is applied.

An entropy decoder 500 according to the exemplary embodiment may include a context modeling unit 510, a binary arithmetic decoding unit 520, a memory 550, and an inverse binarization unit 560, and the binary arithmetic decoding unit 520 may include a regular binary decoding unit 530 and a bypass binary decoding unit 540.

The entropy decoder 500 may receive a bitstream and confirm a bypass flag therefrom. Here, the bypass flag represents whether the bitstream is in a bypass mode, and the bypass mode may mean that the coding is performed by fixing the probability of the currently coded bin as 0.5 without using the context model.

If the bitstream is not in the bypass mode according to the bypass flag, the regular binary decoding unit 530 may perform the binary arithmetic decoding according to a regular mode.

At this time, the context modeling unit 510 may select the probability information necessary for decoding a current bitstream from the memory 550 to transmit the probability information to the regular binary decoding unit 530.

Meanwhile, if the bitstream is in the bypass mode according to the bypass flag, the bypass binary decoding unit 540 may perform the binary arithmetic decoding according to the bypass mode.

The inverse binarization unit 560 may receive the bin of the binary form decoded by the binary arithmetic decoding unit 520 and transform the bin into a syntax element value in an integer form to output the transformed syntax element value.

Figure 6:
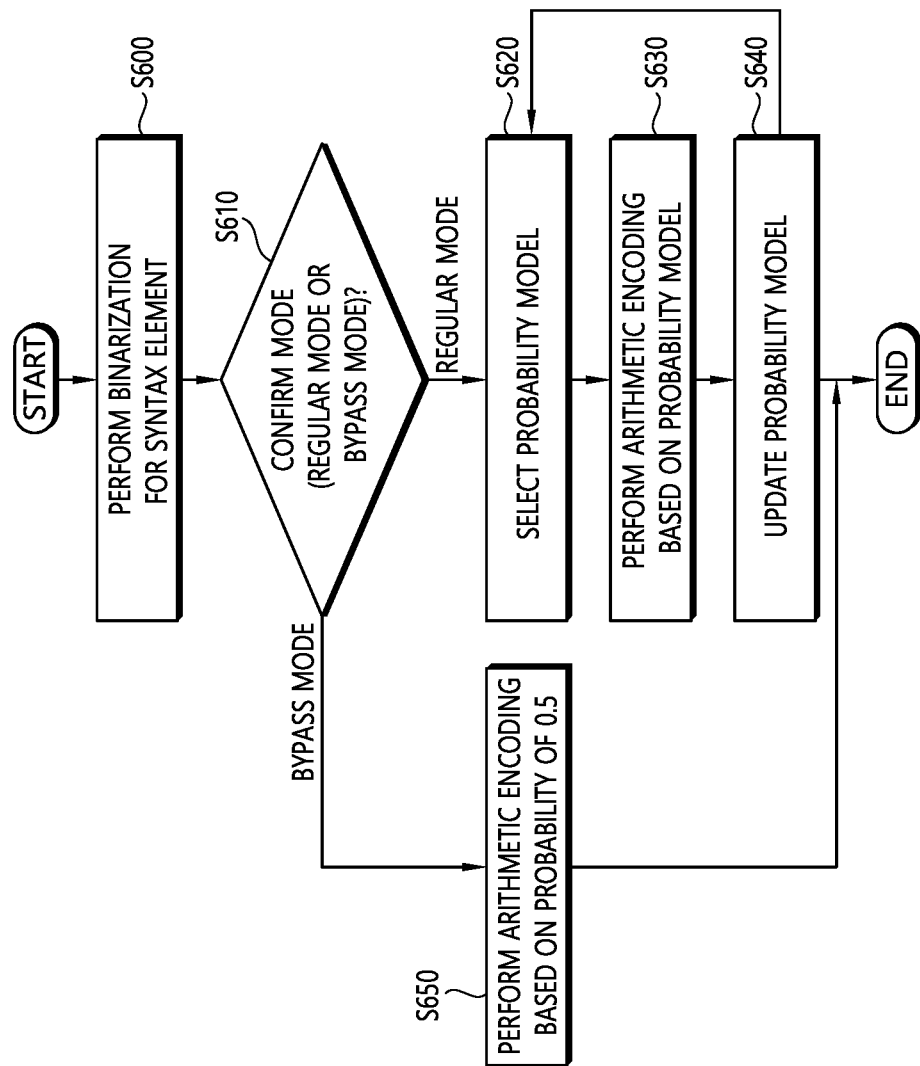
FIG. 6 is a flowchart illustrating an operation of the entropy encoder according to the exemplary embodiment.

FIG. 6 is a flowchart illustrating an operation of an entropy encoder according to the exemplary embodiment.

The entropy encoder of the encoding apparatus according to the exemplary embodiment may perform binarization for the syntax element (S610).

The entropy encoder according to the exemplary embodiment may determine whether to perform the binary arithmetic coding according to the regular mode or to perform the binary arithmetic coding according to the bypass mode (S620). For example, the entropy encoder may confirm whether the bitstream is in the regular mode or the bypass mode based on the bypass flag, and when the bypass flag is 1, it may represent the bypass mode, and when the bypass flag is 0, it may represent the regular mode.

If it is determined that the binary arithmetic coding is to be performed according to the regular mode, the entropy encoder may select the probability model (S630), and perform the binary arithmetic encoding based on the probability model (S640). Further, the entropy encoder may update the probability model (S650), and select a suitable probability model again based on the probability model updated in the step S630.

If it is determined that the binary arithmetic coding is to be performed according to the bypass mode, the entropy encoder may perform the binary arithmetic encoding based on the probability of 0.5 (S660).

Figure 7:
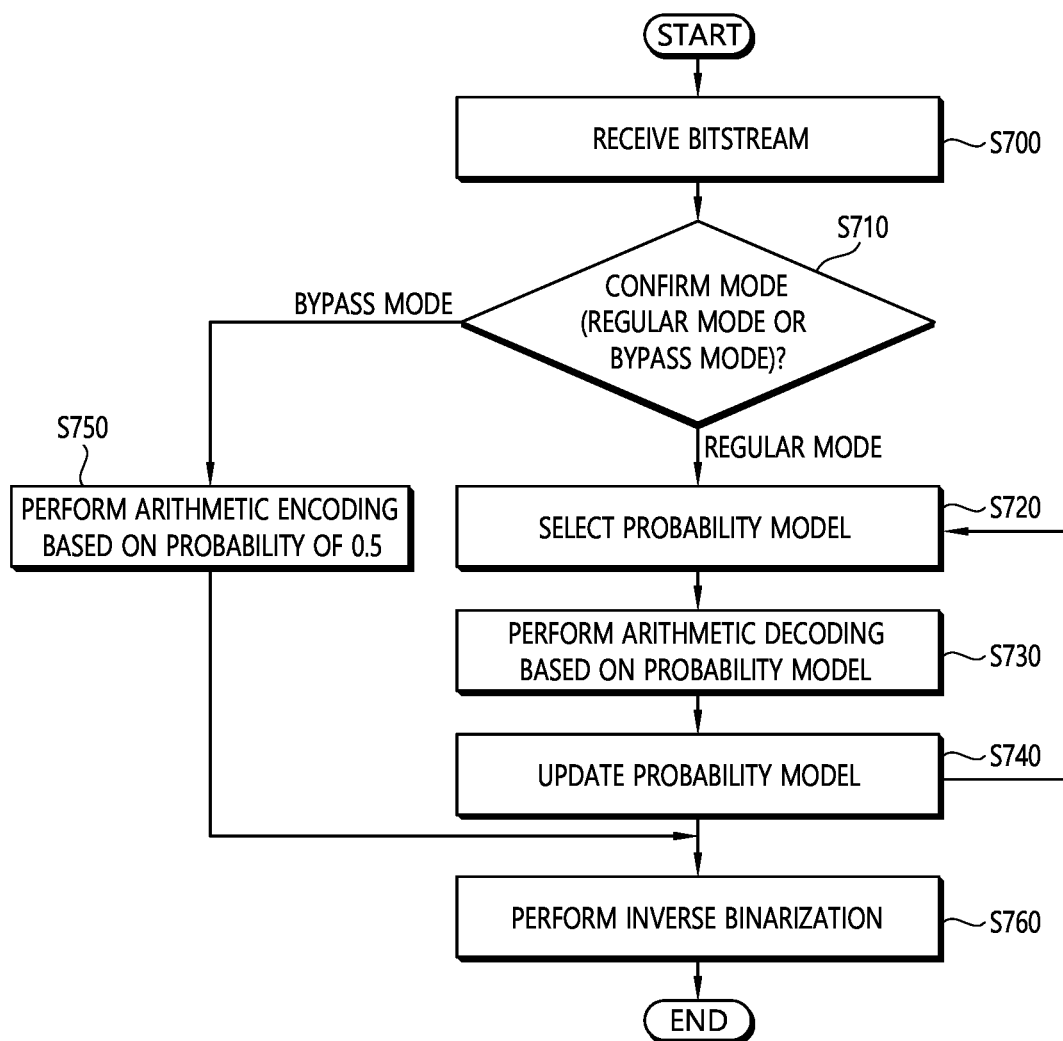
FIG. 7 is a flowchart illustrating an operation of the entropy decoder according to the exemplary embodiment.

FIG. 7 is a flowchart illustrating an operation of the entropy decoder according to the exemplary embodiment.

The entropy decoder of the decoding apparatus according to the exemplary embodiment may receive the bitstream (S710).

The entropy decoder according to the exemplary embodiment may confirm whether the bitstream is in the regular mode or the bypass mode by extracting the bypass flag from the bitstream (S720). Here, the bypass flag may be previously determined according to the kind of syntax.

If the bypass flag represents the regular mode, the entropy decoder may select the probability model (S730), and perform the binary arithmetic decoding based on the selected probability model (S740). Further, the entropy decoder may update the probability model (S750), and select the suitable probability model again based on the probability model updated in the step S730.

Meanwhile, if the bypass flag represents the bypass mode, the entropy decoder may perform the binary arithmetic decoding based on the probability of 0.5 (S760).

The entropy decoder may perform inverse binarization for the decoded bin string (S770). For example, the entropy decoder may receive the decoded bin in the binary form and transform the bin into the syntax element value in the integer form to output the syntax element value.

The exemplary embodiment of the present disclosure proposes a method for determining the context model for the CABAC entropy encoding. As described above, the split_bt_flag may represent whether the current block is split into the BT or split into the TT. The syntax element split_bt_flag may be referred to as mtt_split_cu_binary_flag or the like. The context model for the syntax element split_bt_flag may be determined according to the number of BTs and TTs which may be split from the current block. Equation 1 below expresses a value of the context index (CtxIdx) according to block split availability information.

$$\text{CtxIdx}=(\text{availableBTHOR \&\& availableBTVER})*2+ \\ (\text{availableTTHOR \&\& availableTTVER}) \quad \text{Equation 1}$$

In the present specification, the "block split availability information" may represent a block split condition. The block split availability information may include the binary tree (BT) horizontal split available flag information representing whether the current block may be horizontally split based on the BT structure, the ternary tree (TT) horizontal split available flag information representing whether the current block may be horizontally split based on the TT structure, the BT vertical split available flag information representing whether the current block may be vertically split based on the BT structure, and the TT vertical split available flag information representing whether the current block may be vertically split based on the TT structure. According to the exemplary embodiment, the block split availability information may be derived based on at least one of block size information, multi-type tree depth information, and the maximum multi-tree size information.

In the Equation 1, the availableBTHOR may represent the BT horizontal split available flag information, the availableBTVER may represent the BT vertical split available flag information, the availableTTHOR may represent the TT horizontal split available flag information, and the availableTTVER may represent the TT vertical split available flag information. A range of a value of the CtxIdx may be 0 or more and 3 or less, for example.

The BT horizontal split available flag information may be indicated by various names such as available_BT_HOR and allow SplitBTHor as well as availableBTHOR. Likewise, the BT vertical split available flag information may be indicated by available_BT_VER, allowSplitBTVer, or the like, the TT horizontal split available flag information may be indicated by available_TT_HOR, allowSplitTTHor, or the like, and the TT vertical split available flag information may be indicated by available_TT_VER, allowSplitTTVer, or the like.

Table 5 below expresses an example of the values of the CtxIdx according to the values of the availableBTHOR, the availableBTVER, the availableTTHOR, and the availableTTVER.

TABLE 5

| available-BTHOR | available-BTVER | available-TTHOR | available-TTVER | CtxIdx |
|---|---|---|---|---|
| 0 | 0 | 0 | 0 | N/A |
| 0 | 0 | 0 | 1 | N/A |
| 0 | 0 | 1 | 0 | N/A |
| 0 | 0 | 1 | 1 | N/A |
| 0 | 1 | 0 | 0 | N/A |
| 0 | 1 | 0 | 1 | 0 |
| 0 | 1 | 1 | 0 | 0 |
| 0 | 1 | 1 | 1 | 1 |
| 1 | 0 | 0 | 0 | N/A |
| 1 | 0 | 0 | 1 | 0 |
| 1 | 0 | 1 | 0 | 0 |
| 1 | 0 | 1 | 1 | 1 |

TABLE 5-continued

| available-BTHOR | available-BTVER | available-TTHOR | available-TTVER | CtxIdx |
|---|---|---|---|---|
| 1 | 1 | 0 | 0 | N/A |
| 1 | 1 | 0 | 1 | 2 |
| 1 | 1 | 1 | 0 | 2 |
| 1 | 1 | 1 | 1 | 3 |

When the value of each of the availableBTHOR, the availableBTVER, the availableTTHOR, and the availableTTVER is 0, it represents that the split according to each split structure is not available, and when each value is 1, it represents that the split according to the split structure is available. If the value of the CtxIdx is N/A, it may represent that it is unnecessary to determine the value of the CtxIdx because the signaling of the split_bt_flag is unnecessary.

According to the exemplary embodiment, four context models may be used for encoding the split_bt_flag. Table 6 below expresses an example of the initial values (InitValue) of the CABAC according to the values of the CtxIdx.

TABLE 6

| CtxIdx | InitValue |
|---|---|
| 0 | 152 |
| 1 | 153 |
| 2 | 154 |
| 3 | 152 |

As another example, when the value of the CtxIdx is 0 or 3, the same initial values of the CABAC may be used, and when having the similar statistic property, three context models may be used for encoding the split_bt_flag. That is, when the value of the CtxIdx is 3, the value of the CtxIdx may be replaced with 0. Table 7 below expresses an example of the initial values of the CABAC according to the values of the CtxIdx, when using three context models.

TABLE 7

| CtxIdx | InitValue |
|---|---|
| 0 | 152 |
| 1 | 153 |
| 2 | 154 |

Another exemplary embodiment of the present disclosure proposes another method for determining the context model for the CABAC entropy encoding. As an example, the syntax element split_bt_flag may be first signaled to determine whether it is the BT split or the TT split, and then the syntax element split_dir may be signaled to determine whether it is the horizontal split or the vertical split. The syntax element split_dir may also be referred to as mtt_split_cu_vertical_flag in some cases. As another example, the syntax element split_dir may be first signaled to determine whether it is the horizontal split or the vertical split, and then the syntax element split_bt_flag may be signaled to determine whether it is the BT split or the TT split.

At this time, the context model for the syntax element split_dir may be determined according to the number of horizontal splits and vertical splits which may be split from the current block. Equation 2 below expresses a value of the context index (CtxIdx) according to the block split availability information.

$$\text{CtxIdx}=(\text{availableBTHOR \&\& availableTTHOR})*2+ \\ (\text{availableBTVER \&\& availableTTVER}) \quad \text{Equation 2}$$

Table 8 below expresses an example of the values of the CtxIdx according to the values of the availableBTHOR, the availableBTVER, the availableTTHOR, and the availableTTVER.

TABLE 8

| available-BTHOR | available-TTHOR | available-BTVER | available-TTVER | CtxIdx |
|---|---|---|---|---|
| 0 | 0 | 0 | 0 | N/A |
| 0 | 0 | 0 | 1 | N/A |
| 0 | 0 | 1 | 0 | N/A |
| 0 | 0 | 1 | 1 | N/A |
| 0 | 1 | 0 | 0 | N/A |
| 0 | 1 | 0 | 1 | 0 |
| 0 | 1 | 1 | 0 | 0 |
| 0 | 1 | 1 | 1 | 1 |
| 1 | 0 | 0 | 0 | N/A |
| 1 | 0 | 0 | 1 | 0 |
| 1 | 0 | 1 | 0 | 0 |
| 1 | 0 | 1 | 1 | 1 |
| 1 | 1 | 0 | 0 | N/A |
| 1 | 1 | 0 | 1 | 2 |
| 1 | 1 | 1 | 0 | 2 |
| 1 | 1 | 1 | 1 | 3 |

In the Table 8, the case where the value of the CtxIdx is N/A may represent the case where it is unnecessary to determine the value of the CtxIdx because the signaling of the split_dir_flag is unnecessary.

According to the exemplary embodiment, referring to the Table 8, if the value of the availableBTHOR and the value of the availableTTHOR are 0 or the values of the availableBTVER and the availableTTVER are 0, it may be confirmed that the CtxIdx for the split_dir is not derived.

According to the exemplary embodiment, referring to the Table 8, when a value of the (availableBTHOR||availableTTHOR) && (availableBTVER||availableTTVER) is 0, it may be confirmed that the CtxIdx for the split_dir is not derived.

According to the exemplary embodiment, four context models may be used for encoding the split_dir_flag. Table 9 below expresses an example of the initial values (InitValue) of the CABAC according to the values of the CtxIdx.

TABLE 9

| CtxIdx | InitValue |
|---|---|
| 0 | 154 |
| 1 | 155 |
| 2 | 153 |
| 3 | 154 |

As another example, when the value of the CtxIdx is 0 or 3, the same initial values of the CABAC are used, and when having the similar statistic property, three context models may be used for encoding the split_bt_flag. That is, when the value of the CtxIdx is 3, the value of the CtxIdx may be replaced with 0. Table 10 below expresses an example of the initial values of the CABAC according to the values of the CtxIdx, in the case of using three context models.

TABLE 10

| CtxIdx | InitValue |
|---|---|
| 0 | 154 |
| 1 | 155 |
| 2 | 153 |

The exemplary embodiment may determine the block split according to the transform size. An available transform size for the currently decoded image or picture may be transmitted from the unit of a sequence parameter set (SPS), a picture parameter set (PPS), a slice header (SH), a header of a network abstract layer (NAL) unit, or the like. For the available transform size, the corresponding transform size may also be transmitted one by one, and the corresponding index may also be transmitted based on a predefined transform set. The decoder terminal may receive and decode the index to induce the available transform size.

When the available transform size is determined, the size of the available block split may be determined. That is, the size of the available block split is defined for the currently decoded image and picture. The size of the available block split may be determined by the case where the transform is available. Therefore, the split of the block in which the transform does not exist may not be allowed.

The size of the available block split is determined for the image and picture, and then it may be determined whether the block may be split in the block unit, that is, a CU or PU unit. The kind of available block split is determined based on the size of the current block. That is, the BT or TT available candidates may be configured horizontally and vertically. Alternatively, whether the splits of the 1/4, 3/4 rates, the splits of the 3/8, 5/8 rates, the splits of the 1/3, 2/3 rates, the splits of the 1/5, 4/5 rates, or the like in addition to the split of the 1/2 rate are available may be determined.

The split available block candidates are configured, and then a final block split may be determined by the block split syntax transmitted to the decoder. If one available block candidate exists or no available block candidate exists, the corresponding syntax may not be transmitted.

Figure 8:
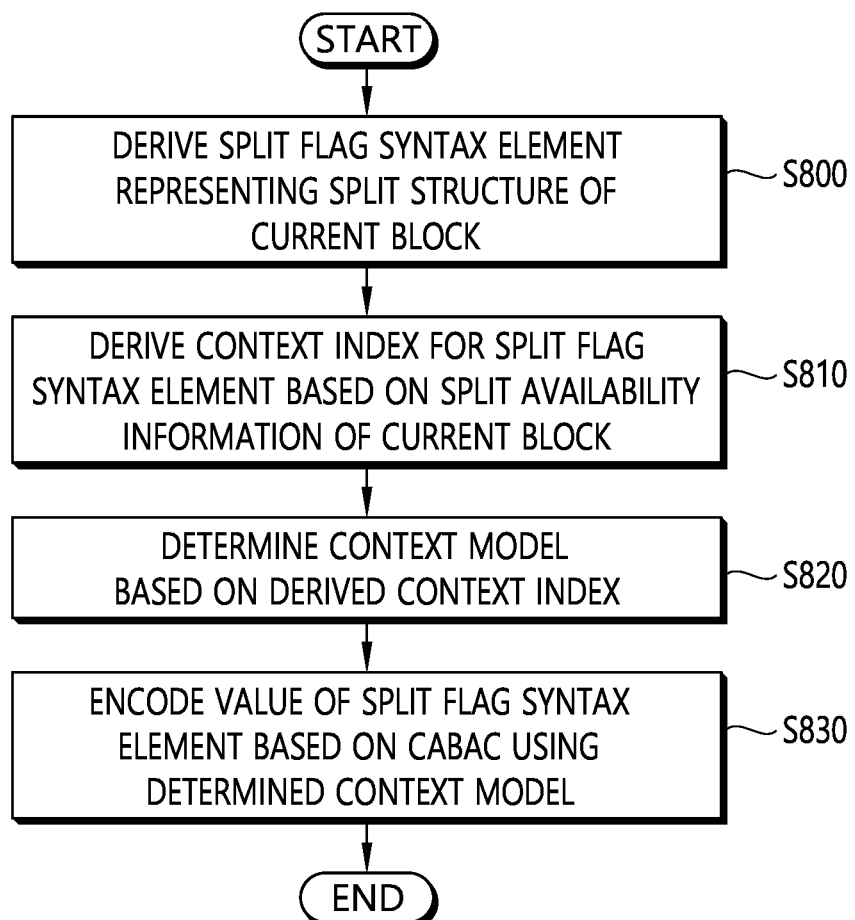
FIG. 8 is a flowchart illustrating an operation of the encoding apparatus according to the exemplary embodiment.
Figure 9:
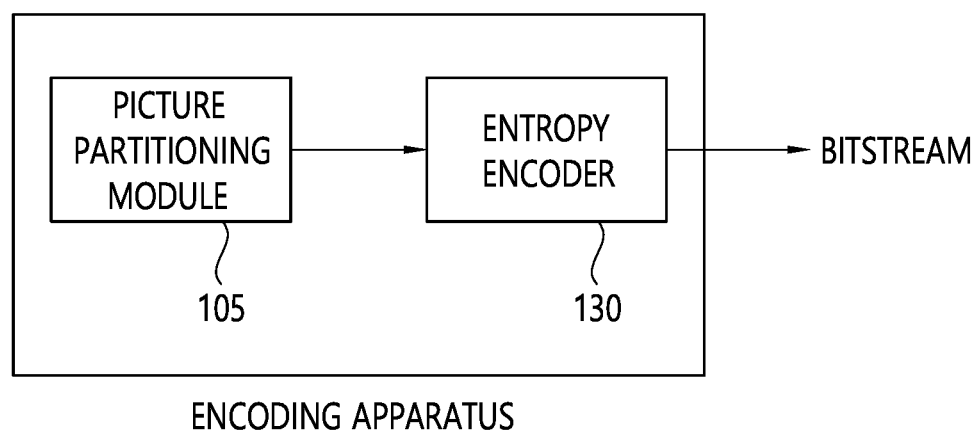
FIG. 9 is a block diagram illustrating a configuration of the encoding apparatus according to the exemplary embodiment.

FIG. 8 is a flowchart illustrating an operation of the encoding apparatus according to the exemplary embodiment, and FIG. 9 is a block diagram illustrating a configuration of the encoding apparatus according to the exemplary embodiment.

The encoding apparatus illustrated in FIGS. 8 and 9 may perform the operation corresponding to that of the decoding apparatus to be described later illustrated in FIGS. 10 and 11. Therefore, the contents to be described later with reference to FIGS. 10 and 11 may also be equally applied to the encoding apparatus illustrated in FIGS. 8 and 9.

Each step illustrated in FIG. 8 may be performed by the encoding apparatus 100 illustrated in FIG. 1. More specifically, S800 to S830 may be performed by the entropy encoder 130 illustrated in FIG. 1. Further, operations according to the S800 to S830 are performed based on some of the contents described above with reference to FIGS. 3 to 7. Therefore, the description of specific contents overlapping the contents described above with reference to FIGS. 3 to 7 will be omitted or simplified.

As illustrated in FIG. 9, the encoding apparatus according to the exemplary embodiment may include a picture partitioning module 105 and the entropy encoder 130. However, in some cases, all of the components illustrated in FIG. 9 may not be essential components of the encoding apparatus, and the encoding apparatus may be implemented by a larger number or a fewer number of components than the components illustrated in FIG. 9.

In the encoding apparatus according to the exemplary embodiment, each of the picture partitioning module 105 and the entropy encoder 130 may be implemented by a separate chip, or two or more components may also be implemented by a single chip.

The encoding apparatus according to the exemplary embodiment may derive a plurality of different coding units by splitting the current block within the current picture. More specifically, the picture partitioning module 105 of the encoding apparatus may derive a plurality of different coding units by splitting the current block within the current picture.

The encoding apparatus according to the exemplary embodiment may derive the split flag syntax element representing the split structure of the current block (S800). More specifically, the entropy encoder 130 of the encoding apparatus may derive the split flag syntax element representing the split structure of the current block.

According to the exemplary embodiment, the split flag syntax element may include the directional split flag representing whether the current block is vertically split and the split syntax element may include the BT split flag representing whether the current block is split based on the BT structure. The directional split flag may be, for example, indicated by the split_dir, and the BT split flag may be, for example, indicated by the split_bt_flag.

The encoding apparatus according to the exemplary embodiment may derive the context index for the split flag syntax element based on the split availability information of the current block (S810). More specifically, the entropy encoder 130 of the encoding apparatus may derive the context index for the split flag syntax element based on the split availability information of the current block.

According to the exemplary embodiment, the split availability information may include the BT horizontal split available flag information representing whether the current block may be horizontally split based on the BT structure, the TT horizontal split available flag information representing whether the current block may be horizontally split based on the TT structure, the BT vertical split available flag information representing whether the current block may be vertically split based on the BT structure, and the TT vertical split available flag information representing whether the current block may be vertically split based on the TT structure.

According to the exemplary embodiment, the BT horizontal split available flag information may be indicated by the availableBTHOR, the TT horizontal split available flag information may be indicated by the availableTTHOR, the BT vertical split available flag information may be indicated by the availableBTVER, and the TT vertical split available flag information may be indicated by the availableTTVER.

According to the exemplary embodiment, the context index for the directional split flag may be derived based on the BT horizontal split available flag information, the TT horizontal split available flag information, the BT vertical split available flag information, and the TT vertical split available flag information.

According to the exemplary embodiment, whether the context index for the directional split flag is derived may be determined based on the BT horizontal split available flag information, the TT horizontal split available flag information, the BT vertical split available flag information, and the TT vertical split available flag information.

According to the exemplary embodiment, if the value of the BT horizontal split available flag information and the value of the TT horizontal split available flag information are 0, or the value of the BT vertical split available flag information and the value of the TT vertical split available flag information are 0, it is characterized in that the context index for the vertical split flag is not derived.

According to the exemplary embodiment, when the value of the (availableBTHOR∥availableTTHOR) && (availableBTVER∥availableTTVER) is 0, the context index for the vertical split flag may not be derived.

According to the exemplary embodiment, the context index for the BT split flag may be derived based on the BT horizontal split available flag information, the TT horizontal split available flag information, the BT vertical split available flag information, and the TT vertical split available flag information.

According to the exemplary embodiment, the context index for the directional split flag may be derived based on Equation 3 below.

$$\text{CtxIdx}=(\text{availableBTHOR \&\& availableTTHOR})*2+ (\text{availableBTVER \&\& availableTTVER}) \quad \text{Equation 3}$$

According to the exemplary embodiment, the context index for the BT split flag may be derived based on Equation 4 below.

$$\text{CtxIdx}=(\text{availableBTHOR \&\& availableBTVER})*2+ (\text{availableTTHOR \&\& availableTTVER}) \quad \text{Equation 4}$$

The encoding apparatus according to the exemplary embodiment may determine the context model based on the derived context index (S820). More specifically, the entropy encoder 130 of the encoding apparatus may determine the context model based on the derived context index.

The encoding apparatus according to the exemplary embodiment may encode the value of the split flag syntax element based on the CABAC using the determined context model (S830). More specifically, the entropy encoder 130 of the encoding apparatus may encode the value of the split flag syntax element based on the CABAC using the determined context model.

According to the encoding apparatus and the method for operating the encoding apparatus illustrated in FIGS. 8 and 9, the encoding apparatus may derive the split flag syntax element representing the split structure of the current block (S800), derive the context index for the split flag syntax element based on the split availability information of the current block (S810), determine the context model based on the derived context index (S820), and encode the value of the split flag syntax element based on the CABAC using the determined context model (S830), and at this time, it may be characterized in that the split flag syntax element may include the directional split flag representing whether the current block is vertically split, the split availability information may include the BT horizontal split available flag information representing whether the current block may be vertically split based on the BT structure, the TT horizontal split available flag information representing whether the current block may be horizontally split based on the TT structure, the BT vertical split available flag information representing whether the current block may be vertically split based on the BT structure, and the TT vertical split available flag information representing whether the current block may be vertically split based on the TT structure, and the context index for the directional split flag is derived based on the BT horizontal split available flag information, the TT horizontal split available flag information, the BT vertical split available flag information, and the TT vertical split available flag information. That is, as illustrated in FIGS. 8 and 9, when the entropy encoding according to the CABAC is performed based on the QT structure, the BT structure, and the TT structure, it is possible to perform the encoding and the decoding more efficiently using the context model.

Figure 10:
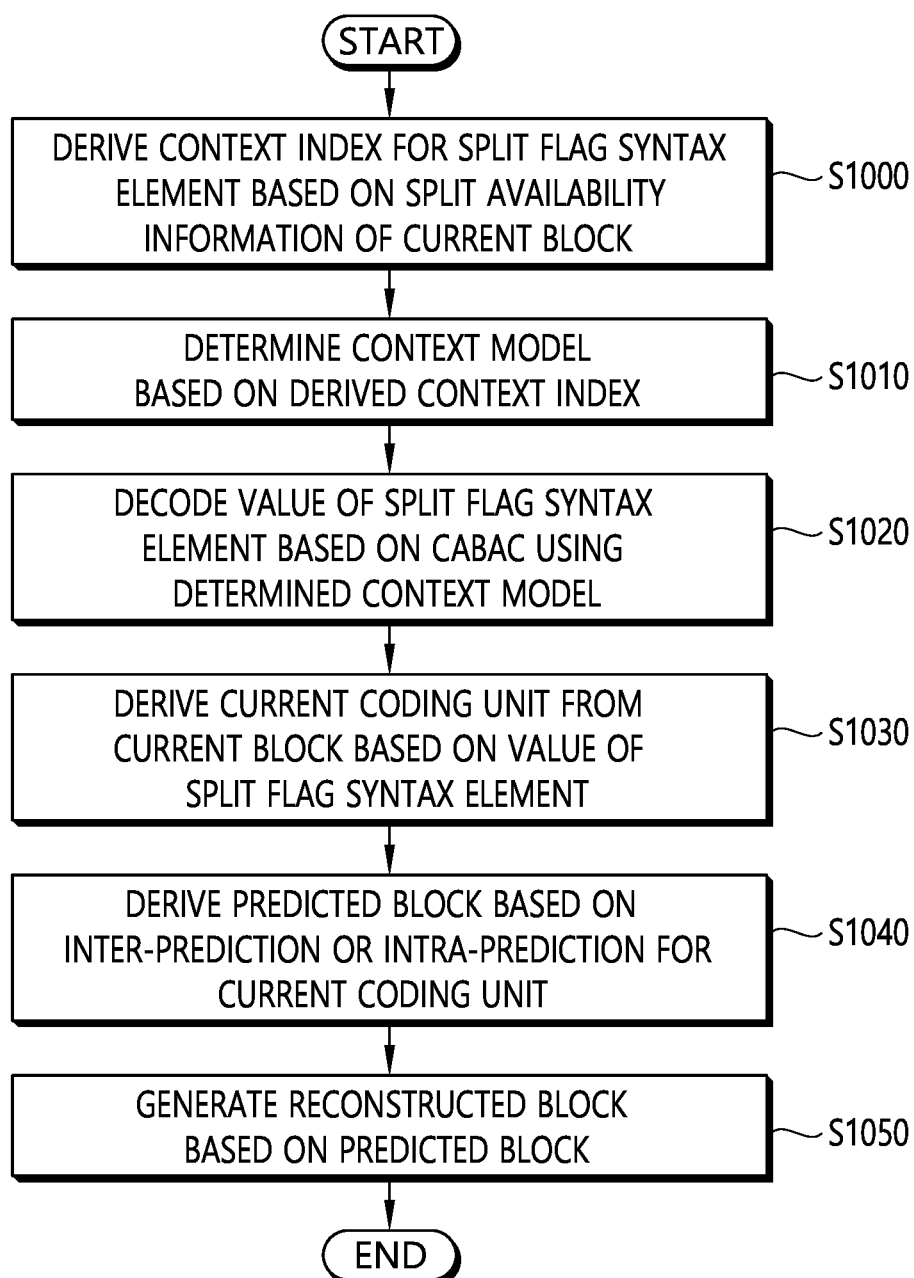
FIG. 10 is a flowchart illustrating an operation of the decoding apparatus according to the exemplary embodiment.
Figure 11:
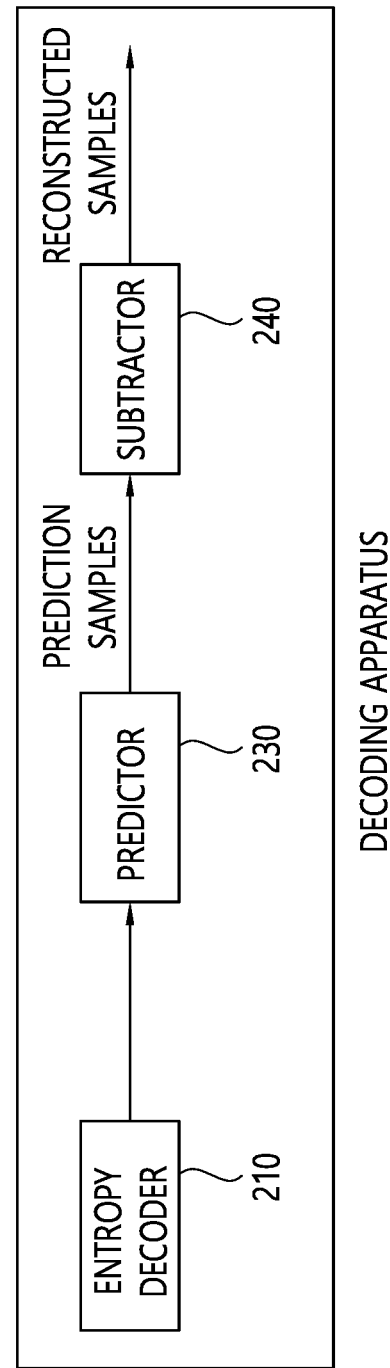
FIG. 11 is a block diagram illustrating a configuration of the decoding apparatus according to the exemplary embodiment.

FIG. 10 is a flowchart illustrating an operation of the decoding apparatus according to the exemplary embodiment, and FIG. 11 is a block diagram illustrating a configuration of the decoding apparatus according to the exemplary embodiment.

Each step illustrated in FIG. 10 may be performed by the decoding apparatus 200 illustrated in FIG. 2. More specifically, S1000 to S1030 may be performed by the entropy decoder 210 illustrated in FIG. 2, S1040 may be performed by the predictor 230 illustrated in FIG. 2, and S1050 may be performed by the adder 240 illustrated in FIG. 2. Further, operations according to the S1000 to S1050 are performed based on some of the contents described above with reference to FIGS. 3 to 7. Therefore, the description of the specific contents overlapping the contents described above with reference to FIGS. 3 to 7 will be omitted or simplified.

As illustrated in FIG. 11, the decoding apparatus according to the exemplary embodiment may include the entropy decoder 210, the predictor 230, and the adder 240. However, in some cases, all of the components illustrated in FIG. 11 may not be the essential components of the decoding apparatus, and the decoding apparatus may be implemented by a larger number or a fewer number of components than the components illustrated in FIG. 11.

In the decoding apparatus according to the exemplary embodiment, each of the entropy decoder 210, the predictor 230, and the adder 240 may be implemented by a separate chip, or two or more components may also be implemented by a single chip.

The decoding apparatus according to the exemplary embodiment may derive the context index for the split flag syntax element based on the split availability information of the current block (S1000). More specifically, the entropy decoder 210 of the decoding apparatus may derive the context index for the split flag syntax element based on the split availability information of the current block.

According to the exemplary embodiment, the split flag syntax element may include the directional split flag representing whether the current block is vertically split and the split syntax element may include the BT split flag representing whether the current block is split based on the BT structure. The directional split flag may be, for example, indicated by the split_dir, and the BT split flag may be, for example, the split_bt_flag.

According to the exemplary embodiment, the split availability information may include the BT horizontal split available flag information representing whether the current block may be horizontally split based on the BT structure, the TT horizontal split available flag information representing whether the current block may be horizontally split based on the TT structure, the BT vertical split available flag information representing whether the current block may be vertically split based on the BT structure, and the TT vertical split available flag information representing whether the current block may be vertically split based on the TT structure.

As an example, the BT horizontal split available flag information may be indicated by the availableBTHOR, the TT horizontal split available flag information may be indicated by the availableTTHOR, the BT vertical split available flag information may be indicated by the availableBTVER, and the TT vertical split available flag information may be indicated by the availableTTVER.

According to the exemplary embodiment, the context index for the directional split flag may be derived based on the BT horizontal split available flag information, the TT horizontal split available flag information, the BT vertical split available flag information, and the TT vertical split available flag information.

According to the exemplary embodiment, whether the context index for the directional split flag is derived may be determined based on the BT horizontal split available flag information, the TT horizontal split available flag information, the BT vertical split available flag information, and the TT vertical split available flag information.

According to the exemplary embodiment, if the value of the BT horizontal split available flag information and the value of the TT horizontal split available flag information are 0, or the value of the BT vertical split available flag information and the value of the TT vertical split available flag information are 0, the context index for the directional split flag may not be derived.

According to the exemplary embodiment, when the value of the (availableBTHOR||availableTTHOR) && (availableBTVER||availableTTVER) is 0, the context index for the directional split flag may not be derived.

According to the exemplary embodiment, the context index for the BT split flag may be derived based on the BT horizontal split available flag information, the TT horizontal split available flag information, the BT vertical split available flag information, and the TT vertical split available flag information.

According to the exemplary embodiment, the context index for the directional split flag may be derived based on Equation 5 below.

$$\text{CtxIdx}=(\text{availableBTHOR \&\& availableTTHOR})*2+ (\text{availableBTVER \&\& availableTTVER}) \quad \text{Equation 5}$$

According to the exemplary embodiment, the context index for the BT split flag may be derived based on Equation 6 below.

$$\text{CtxIdx}=(\text{availableBTHOR \&\& availableBTVER})*2+ (\text{availableTTHOR \&\& availableTTVER}) \quad \text{Equation 6}$$

The decoding apparatus according to the exemplary embodiment may determine the context model based on the derived context index (S1010). More specifically, the entropy decoder 210 of the decoding apparatus may determine the context model based on the derived context index.

The decoding apparatus according to the exemplary embodiment may decode the value of the split flag syntax element based on the context-based adaptive binary arithmetic coding (CABAC) using the determined context model (S1020). More specifically, the entropy decoder 210 of the decoding apparatus may decode the value of the split flag syntax element based on the CABAC using the determined context model.

The decoding apparatus according to the exemplary embodiment may derive the current coding unit from the current block based on the value of the split flag syntax element (S1030). More specifically, the entropy decoder 210 of the decoding apparatus may derive the current coding unit from the current block based on the value of the split flag syntax element.

The decoding apparatus according to the exemplary embodiment may derive the predicted block based on the inter-prediction or the intra-prediction for the current coding unit (S1040). More specifically, the predictor 230 of the decoding apparatus may derive the predicted block based on the inter-prediction or the intra-prediction for the current coding unit.

The decoding apparatus according to the exemplary embodiment may generate a reconstructed block based on the predicted block (S1050). More specifically, the adder 240 of the decoding apparatus may generate the reconstructed block based on the predicted block.

According to the decoding apparatus and the method for operating the decoding apparatus illustrated in FIGS. 10 and 11, the decoding apparatus may derive the context index for the split flag syntax element based on the split availability information of the current block (S1000), determine the context model based on the derived context index (S1010), decode the value of the split flag syntax element based on the context-based adaptive binary arithmetic coding (CABAC) using the determined context model (S1020), derive the current coding unit from the current block based on the value of the split flag syntax element (S1030), derive the predicted block based on the inter-prediction or the intra-prediction for the current coding unit (S1040), and generate the reconstructed block based on the predicted block (S1050), and at this time, it may be characterized in that the split flag syntax element may include the directional split flag representing whether the current block is vertically split, the split availability information may include the BT horizontal split available flag information representing whether the current block may be horizontally split based on the BT structure, the TT horizontal split available flag information representing whether the current block may be horizontally split based on the TT structure, the BT vertical split available flag information representing whether the current block may be vertically split based on the BT structure, and the TT vertical split available flag information representing whether the current block may be vertically split based on the TT structure; and the context index for the directional split flag is derived based on the BT horizontal split available flag information, the TT horizontal split available flag information, the BT vertical split available flag information, and the TT vertical split available flag information. That is, as illustrated in FIGS. 10 and 11, when the entropy encoding according to the CABAC is performed based on the QT structure, the BT structure, and the TT structure, it is possible to perform the encoding and the decoding more efficiently using the context model.

The exemplary embodiments described in the present disclosure may be implemented and performed by a processor, a microprocessor, a controller, or a chip. For example, the functional units illustrated in each drawing may be implemented and performed by a computer, the processor, the microprocessor, the controller, or the chip.

Further, the decoder and the encoder to which the exemplary embodiments of the present disclosure are applied may be included in a multimedia broadcasting transceiver, a mobile communication terminal, a home cinema video device, a digital cinema video device, a surveillance camera, a video chat device, a real-time communication device such as a video communication device, a mobile streaming device, a storage medium, a camcorder, a video on demand (VoD) service providing device, an over the top (OTT) video device, an Internet streaming service providing device, a three-dimensional (3D) video device, an image telephony video device, a medial video device, or the like, and used for processing a video signal or a data signal. For example, the over the top (OTT) video device may include a game console, a Blue-ray player, an Internet access TV, a home theater system, a smartphone, a tablet PC, a digital video recorder (DVR), or the like.

Further, the processing method to which the exemplary embodiments of the present disclosure are applied may be produced in the form of a program executed by a computer, and stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (for example, transmission over the Internet). Further, a bitstream generated by the encoding method may be stored in a computer-readable recording medium or transmitted through a wired or wireless communication network.

Further, the exemplary embodiments of the present disclosure may be embodied as a computer program product by program codes, and the program codes may be executed on a computer by the exemplary embodiments of the present disclosure. The program codes may be stored on a computer-readable carrier.

Figure 12:
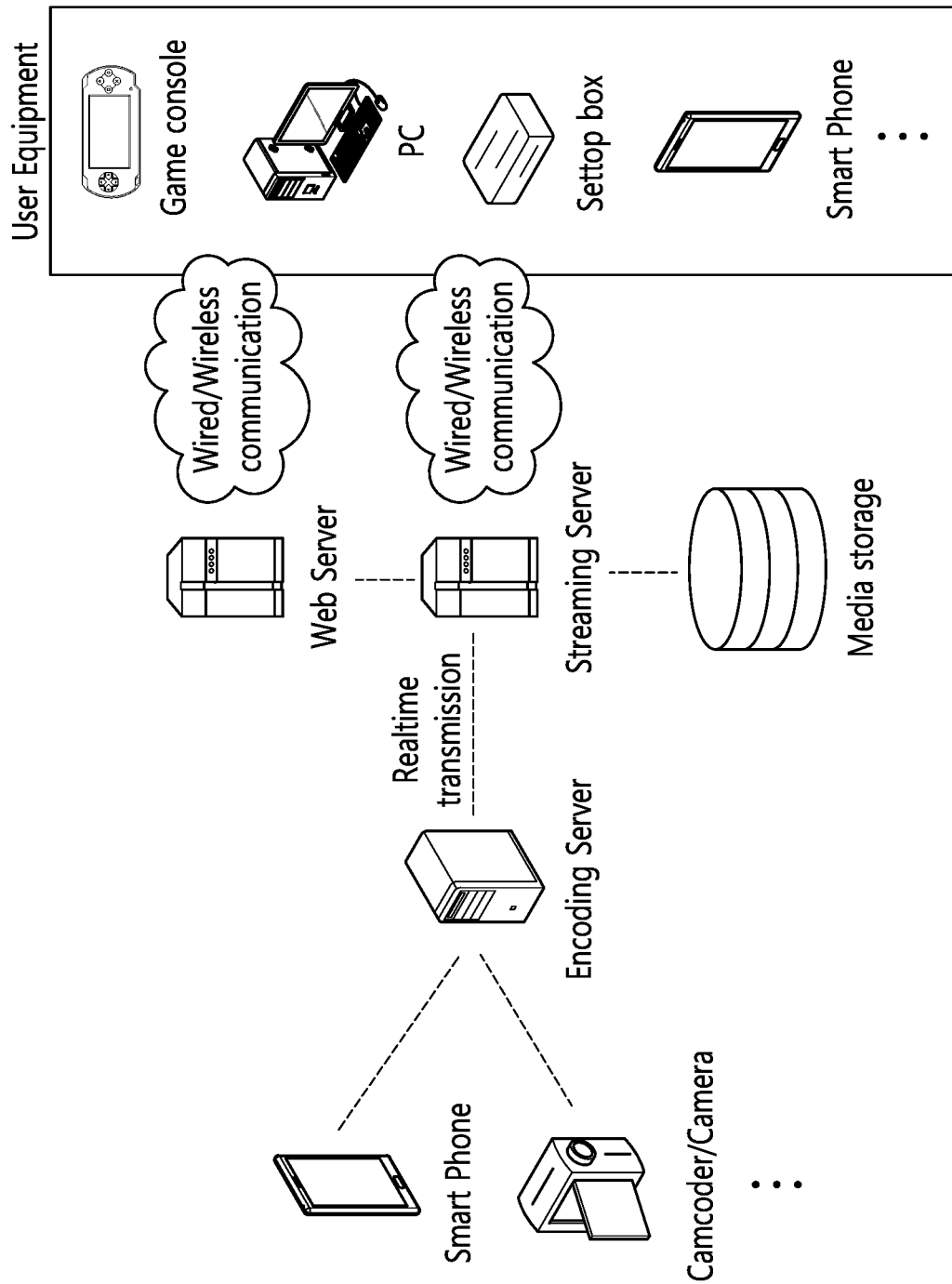
FIG. 12 is a contents streaming system structure diagram according to the exemplary embodiment.

FIG. 12 is a contents streaming system structure diagram according to the exemplary embodiment.

The contents streaming system to which the present disclosure is applied may largely include an encoding server, a streaming server, a web server, a media storage, user equipment, and a multimedia input device.

The encoding server serves to compress, to digital data, the contents input from the multimedia input devices, such as a smartphone, a camera, and a camcoder, to generate a bitstream, and to transmit the bitstream to the streaming server. As another example, if the multimedia input device, such as a smartphone, a camera, or a camcoder, directly generates a bitstream, the encoding server may be omitted.

The bitstream may be generated by the encoding method or the bitstream generation method to which the present disclosure is applied, and the streaming server may temporarily store the bitstream in a process of transmitting or receiving the bitstream.

The streaming server transmits multimedia data to the user equipment based on a user's request through the web server, and the web server serves as a medium which informs the user of what service there is. When the user requests a desired service to the web server, the web server transfers the service to the streaming server, and the streaming server transmits multimedia data to the user. At this time, the contents streaming system may include a separate control server, and in this case, the control server serves to control instructions/responses between respective equipment in the contents streaming system.

The streaming server may receive contents from the media storage and/or the encoding server. For example, if the contents are received from the encoding server, the contents may be received in real time. In this case, the streaming server may store the bitstream for a predetermined time to provide the streaming service smoothly.

Examples of the user equipment may include a mobile phone, a smartphone, a laptop computer, a digital broadcasting terminal, a personal digital assistant (PDA), a portable multimedia player (PMP), a navigation device, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

The respective servers in the contents streaming system may be operated as a distributed server, and in this case, data received by each server may be processed in distributed manner.

The aforementioned method according to the present disclosure may be embodied in the form of software, and the encoding apparatus and/or decoding apparatus according to the present disclosure may be included in an apparatus for performing the image processing, such as a TV, a computer, a smartphone, a set-top box, or a display device.

Each of the part, the module, or the unit described above may be a processor or a hardware part executing consecutive implementation processes stored in the memory (or storage unit). Each step described in the aforementioned exemplary embodiment may be performed by the processor or the hardware parts. The respective modules/blocks/units described in the aforementioned exemplary embodiment may be operated as the hardware/the processor. Further, the methods provided by the present disclosure may be executed as a code. This code may be written in the processor-readable storage medium, and therefore, read by the processor provided by the apparatus.

In the aforementioned exemplary embodiments, the methods are explained based on flowcharts by means of a series of steps or blocks, but the present disclosure is not limited to the order of steps, and a certain step may occur in order or step different from that described above, or concurrently with that described above. Further, it may be understood by a person having ordinary skill in the art that the steps shown in a flowchart are not exclusive, and that another step may be incorporated or one or more steps of the flowchart may be removed without affecting the scope of the present disclosure.

When the exemplary embodiments according to the present disclosure are embodied by software, the aforementioned methods may be embodied by modules (processes, functions, or the like) performing the aforementioned function. The module may be stored in a memory and executed by a processor. The memory may be inside or outside the processor and connected to the processor via well-known various means. The processor may include an application-specific integrated circuit (ASIC), other chipset, a logic circuit, and/or a data processing device. The memory may include a read-only memory (ROM), a random access memory (RAM), a flash memory, a memory card, a storage medium, and/or other storage device.

What is claimed is:

1. An image decoding apparatus for an image decoding, the image decoding apparatus comprising:
   a memory; and
   at least one processor connected to the memory, the at least one processor configured to:
   derive a context index for a split flag syntax element based on split availability information of a current block;
   determine a context model based on the derived context index;
   decode a value of the split flag syntax element based on context-based adaptive binary arithmetic coding (CABAC) by using the determined context model;
   derive a current coding unit from the current block based on the value of the split flag syntax element;
   derive a predicted block based on inter-prediction or intra-prediction for the current coding unit; and
   generate a reconstructed block based on the predicted block,
   wherein the split flag syntax element comprises: a directional split flag representing whether the current block is to be vertically split,
   wherein the split availability information comprises: a binary tree (BT) horizontal split available flag information related to whether the current block is allowed to be horizontally split based on a BT structure, a ternary tree (TT) horizontal split available flag information related to whether the current block is allowed to be horizontally split based on a TT structure, a BT vertical split available flag information related to whether the current block is allowed to be vertically split based on the BT structure, and a TT vertical split available flag information related to whether the current block is allowed to be vertically split based on the TT structure,
   wherein the context index for the directional split flag is derived based on all of the BT horizontal split available flag information, the TT horizontal split available flag information, the BT vertical split available flag information, and the TT vertical split available flag information,
   wherein the BT horizontal split available flag information is different from the TT horizontal split available flag information, and
   wherein the BT vertical split available flag information is different from the TT vertical split available flag information.

2. An image encoding apparatus for an image encoding, the image encoding apparatus comprising:
   a memory; and
   at least one processor connected to the memory, the at least one processor configured to:
   derive a split flag syntax element representing a split structure of a current block;
   derive a context index for the split flag syntax element based on split availability information of the current block;
   determine a context model based on the derived context index; and
   encode a value of the split flag syntax element based on CABAC using the determined context model,
   wherein the split flag syntax element comprises: a directional split flag representing whether the current block is vertically split,
   wherein the split availability information comprises: a BT horizontal split available flag information related to whether the current block is allowed to be horizontally split based on a BT structure, a TT horizontal split available flag information related to whether the current block is allowed to be horizontally split based on a TT structure, a BT vertical split available flag information related to whether the current block is allowed to be vertically split based on the BT structure, and a TT vertical split available flag information related to whether the current block is allowed to be vertically split based on the TT structure,
   wherein the context index for the directional split flag is derived based on all of the BT horizontal split available flag information, the TT horizontal split available flag information, the BT vertical split available flag information, and the TT vertical split available flag information,
   wherein the BT horizontal split available flag information is different from the TT horizontal split available flag information, and wherein the BT vertical split available flag information is different from the TT vertical split available flag information.

3. An apparatus for transmitting data for an image, the apparatus comprising:
at least one processer configured to obtain a bitstream, wherein the bitstream is generated based on deriving a split flag syntax element representing a split structure of a current block, deriving a context index for the split flag syntax element based on split availability information of the current block, determining a context model based on the derived context index and generating the bitstream by encoding a value of the split flag syntax element based on CABAC using the determined context model; and
a transmitter configured to transmit the data comprising the bitstream,
wherein the split flag syntax element comprises: a directional split flag representing whether the current block is vertically split,
wherein the split availability information comprises: a BT horizontal split available flag information related to whether the current block is allowed to be horizontally split based on a BT structure, a TT horizontal split available flag information related to whether the current block is allowed to be horizontally split based on a TT structure, a BT vertical split available flag information related to whether the current block is allowed to be vertically split based on the BT structure, and a TT vertical split available flag information related to whether the current block is allowed to be vertically split based on the TT structure,
wherein the context index for the directional split flag is derived based on all of the BT horizontal split available flag information, the TT horizontal split available flag information, the BT vertical split available flag information, and the TT vertical split available flag information,
wherein the BT horizontal split available flag information is different from the TT horizontal split available flag information, and
wherein the BT vertical split available flag information is different from the TT vertical split available flag information.

* * * * *